(12) United States Patent
Carminati et al.

(10) Patent No.: US 11,393,183 B2
(45) Date of Patent: Jul. 19, 2022

(54) INTEGRATED ELECTRONIC MODULE FOR 3D SENSING APPLICATIONS, AND 3D SCANNING DEVICE INCLUDING THE INTEGRATED ELECTRONIC MODULE

(71) Applicant: STMicroelectronics S.r.l., Agrate Brianza (IT)

(72) Inventors: Roberto Carminati, Piancogno (IT); Fabio Bottinelli, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/826,983

(22) Filed: Mar. 23, 2020

(65) Prior Publication Data

US 2020/0302205 A1    Sep. 24, 2020

(30) Foreign Application Priority Data

Mar. 22, 2019  (IT) .......................... 102019000004197

(51) Int. Cl.
*G06V 10/145* (2022.01)
*G01S 17/894* (2020.01)
*G06V 20/64* (2022.01)
*G06V 40/16* (2022.01)

(52) U.S. Cl.
CPC .......... *G06V 10/145* (2022.01); *G01S 17/894* (2020.01); *G06V 20/64* (2022.01); *G06V 40/172* (2022.01)

(58) Field of Classification Search
CPC ............. G06K 9/2036; G06K 9/00201; G06K 9/00288; G06K 9/00221; G01S 7/4816; G01S 7/4817; G01S 7/4813; G01S 7/4814; G01S 17/894; G01S 17/89; G01S 17/42; H01L 23/04; H01L 25/165; H01L 25/167
See application file for complete search history.

(56) References Cited

U.S. PATENT DOCUMENTS

| | | | |
|---|---|---|---|
| 2016/0223319 A1* | 8/2016 | Munro | G01S 17/88 |
| 2016/0320691 A1* | 11/2016 | Andreev | F21V 29/508 |
| 2018/0180400 A1* | 6/2018 | Homma | G01B 9/02044 |
| 2018/0301875 A1* | 10/2018 | Burroughs | H01S 5/04254 |
| 2019/0227151 A1* | 7/2019 | Bikumandla | G02B 27/0087 |
| 2020/0274320 A1* | 8/2020 | Inada | G06K 9/2027 |

FOREIGN PATENT DOCUMENTS

JP    2010080784 A * 4/2010

* cited by examiner

*Primary Examiner* — Edward F Urban
*Assistant Examiner* — Wassim Mahrouka
(74) *Attorney, Agent, or Firm* — Crowe & Dunlevy (57) ABSTRACT

A substrate and a covering structure coupled to the substrate form a chamber. The chamber houses an emitter configured to emit a radiation, a resonant reflector, a detector, and a fixed reflector. First and second windows extend through the covering structure. The emitter, the first reflector and the second reflector are reciprocally arranged such that radiation emitted from the emitter is reflected by the fixed reflector towards the MEMS reflector for further reflection towards the first window to form an output signal. The detector and the second window are reciprocally arranged such that an incoming radiation passing through the second window is received by the detector. The electronic module can be used for a 3D sensing application.

27 Claims, 9 Drawing Sheets

Fig.11

INTEGRATED ELECTRONIC MODULE FOR 3D SENSING APPLICATIONS, AND 3D SCANNING DEVICE INCLUDING THE INTEGRATED ELECTRONIC MODULE

PRIORITY CLAIM

This application claims the priority benefit of Italian Application for Patent No. 102019000004197, filed on Mar. 22, 2019, the content of which is hereby incorporated by reference in its entirety to the maximum extent allowable by law.

TECHNICAL FIELD

The present invention relates to an electronic module, to be used for three dimensional (3D) sensing applications, and to a 3D scanning device including the integrated electronic module.

BACKGROUND

With the introduction of the depth-sensing technology, the usage of 3D sensing is now widely used on smartphones and portable devices in general. In particular, the technology is expected to innovate the security methods through face recognition.

One of the known methods to implement 3D sensing is based on a time-of-flight (ToF) approach. A typical ToF architecture includes an infrared (IR) source configured to generate an IR light pulse towards an object (emitted beam). A beam reflected by the object is received by a detector. Depth is calculated by measuring the time (direct ToF) or the phase shift (indirect ToF) between the emitted and the reflected beam. This approach has several advantages, among which a longer range with higher accuracy and less required power, low processing requirements, accurate minimum object distance (MOD) thanks to higher angular resolution, and high immunity to blare effect (in case of objects in motion). However, it is sensitive to reflections and scattering phenomena.

Another known method to implement 3D sensing is based on structured light. In this case, a known pattern is projected onto an object; the pattern thus projected is distorted by the object, and an analysis of the distortion of the light pattern can be used to calculate a depth value and achieve a geometric reconstruction of the object's shape. This technique has the advantages of being less sensitive to reflection and scattering and to allow the implementation of high volume solutions with an ongoing cost-optimization path. However, it requires heavy processing, complex component assembly and the resolution is limited by the component's resolution.

It is known to implement the systems discussed above with a split projection/detection scheme, such as a solution where the projector and the detector are each contained within their own package and physically separated from each other, even though they might be mounted on a same printed-circuit board. In particular, the projector typically includes a LASER source and a micro-mirror manufactured in microelectromechanical system (MEMS) technology; the LASER source is oriented so that a beam is directed towards the micro-mirror, and the micro-mirror is controlled in oscillation to direct the beam towards a target. The main limitation of this approach is the system complexity and the need to cooperate with partners that can design and manufacture opto-mechanical solutions. Moreover, by having the projector and the detector mounted as separate modules, the integration is reduced and the size of the final module increased. Smaller dimensions can be achieved to the detriment of the system performance.

There is therefore a need in the art for a technical solution the overcomes the above issues and drawbacks of the known art without having an impact on the performance.

SUMMARY

In an embodiment, an electronic module comprises: a base substrate; a covering structure that is coupled to the base substrate and forms, with said base substrate, a chamber; an emitter in said chamber that is configured to generate a first radiation; a first reflector in said chamber; a second reflector in said chamber; a first window which extends through the covering structure and is transparent to said first radiation; a second window which extends through the covering structure at a distance from said first window and is transparent to a second radiation coming from an environment out of said chamber; a detector in said chamber that is configured to sense said second radiation, wherein the emitter, the first reflector and the second reflector are reciprocally arranged such that the first radiation generated by the emitter is reflected by the second reflector towards the first reflector and reflected by the first reflector towards the first window to form an output of said electronic module, and wherein the detector and the second window are reciprocally arranged such that the second radiation passing through the second window is received by the detector.

BRIEF DESCRIPTION OF THE DRAWINGS

For a better understanding of the present invention, preferred embodiments thereof are now described purely by way of non-limiting example with reference to the attached drawings, wherein:

FIG. 5A-10 show a cross-sectional and top-plan views of an electronic module during manufacturing steps;

DETAILED DESCRIPTION

Figure 1:
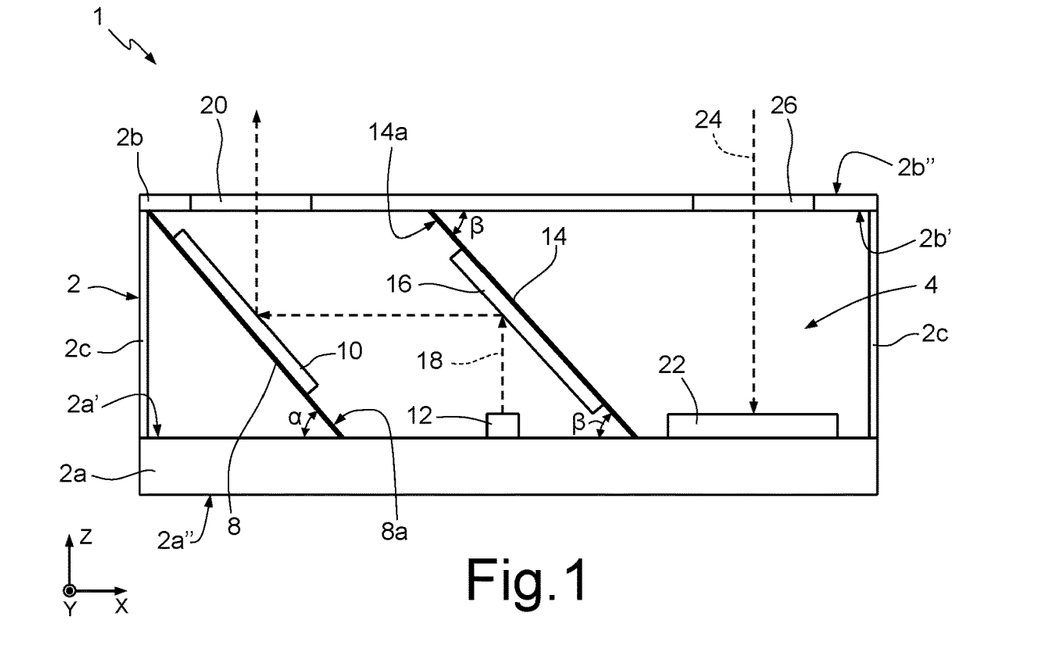
FIGS. 1 to 4 show respective cross-sectional views of electronic modules according to respective embodiments.

FIG. 1 shows, in a Cartesian (triaxial) reference system of axis X, Y, Z, an electronic module 1 to be used for 3D-sensing applications, according to an embodiment.

The electronic module 1 includes a package 2 formed by a base substrate 2a and a cap 2b. The base substrate 2a has a first surface 2a' opposite to a second surface 2a". In the reference system of FIG. 1, the first and the second surfaces 2a', 2a" are parallel to one another and to the XY plane. Analogously, the cap 2b has a first surface 2b' opposite to a second surface 2b". In the reference system of FIG. 1, also the first and the second surfaces 2b', 2b" are parallel to one another and to the XY plane.

According to an embodiment, the base substrate 2a includes, or is mechanically and/or electrically coupled to, a printed-circuit board (PCB) configured to support electronic components and to provide the required routing for the signals received and generated by the electronic components, in a per se known way. In particular, the printed-circuit board is arranged to directly face the chamber 4 so that such electronic components can be housed within the chamber 4.

The PCB may be a rigid circuit board, a flexible circuit board or a rigid-flex circuit board, according to the needs and is coupled directly to the base substrate 2a or, alternatively, through an interface element such as a heat exchanger.

The cap 2b is coupled to the base substrate 2a by means of lateral walls 2c extending between the cap 2b and the base substrate 2a, so that an inner chamber 4 of the package 2 is formed. The lateral walls 2c may be either integral with the cap 2b or the base substrate 2a (and coupled, for example glued, to the other among the cap 2b and the base substrate 2a);

alternatively the lateral walls 2c can be a separate element, coupled (for example, glued) to both the cap 2b and the base substrate 2a.

The first surface 2a' of the base substrate 2a directly faces the chamber 4 (in particular, the first surface 2a' is in the chamber 4); analogously, the first surface 2b' of the cap 2b directly faces the chamber 4 (in particular, the first surface 2b' is in the chamber 4).

A first supporting element 8 extends within the chamber 4 and has a surface 8a defining a supporting plane that forms an angle of incline α with the first surface 2a' of the base substrate 2a. The value of the angle α is in the range of 25-65 degrees, in particular 45 degrees (where α=0 degrees means that the surface 8a is parallel to the first surface 2a' and α=90 degrees means that the surface 8a is orthogonal to the first surface 2a').

Coupled to the surface 8a of the supporting element 8, there is a first reflector 10, in particular a reflector manufactured in MEMS technology (also known as micro-mirror). The first reflector 10 is in particular a MEMS reflector of a resonant type, configured to be coupled to an actuation system that, when operated, causes oscillation of the MEMS reflector in a substantially periodic way around a resting position. This is also known in the art as a "MEMS scanner". Micro-mirrors, or MEMS scanners, of this type are, for example, disclosed in U.S. Pat. No. 9,843,779, and in U.S. Application for Patent No. 2018/0180873 (both incorporated herein by reference). Other types of reflectors or micro-mirrors can be used, as apparent to the skilled person in the art.

The first reflector 10 can be coupled to the supporting element 8 by means of glue or other means such as soldering regions, die-attach film, etc.

The first supporting element 8 is, according to an embodiment, made of thermally-conductive material such as metal. In this case, the first supporting element 8 has also the function of being a heat-sink, for favoring heat dispersion of the first reflector 10 when it is in the form of a MEMS micro-mirror or MEMS scanner and is biased, during use, through electric signals that cause temperature increase by Joule effect. Coupled to the first surface 2a' of the base substrate 2a there is an emitter 12, in particular a Vertical-Cavity Surface-Emitting LASER (VCSEL). The emitter 12 is coupled to the base substrate 2a through the PCB, in a per se known way. In an embodiment, the emitter 12 is an infrared (IR) emitter, configured to emit an IR radiation.

A second supporting element 14 extends within the chamber 4 and has a surface 14a defining a supporting plane that forms an angle of incline β with the first surface 2a' of the base substrate 2a. The value of the angle β is in the range 25-65 degrees, in particular 45 degrees (where β=0 degrees means that the surface 14a is parallel to the first surface 2a' and β=90 degrees means that the surface 14a is orthogonal to the first surface 2a'). It is noted that the same angle of incline β is formed at the intersection between the surface 14a and the first surface 2b' of the cap 2b (where β=0 degrees means that the surface 14a is parallel to the first surface 2b' and β=90 degrees means that the surface 14a is orthogonal to the first surface 2b').

In the embodiment of FIG. 1, the surfaces 8a and 14a of the first and, respectively, second supporting elements 8, 14 are parallel to one another.

Coupled to the surface 14a of the supporting element 14, there is a second reflector 16, in particular a mirror of a fixed type (such that it does not oscillate like the first reflector 10).

The first supporting element 8 (with the first reflector 10) and the second supporting element 14 (with the second reflector 16) are arranged in the chamber 4 in such a way that, when the electronic module 1 is considered in lateral cross section as in FIG. 1, the emitter 12 is arranged between the first supporting element 8 and the second supporting element 14. Furthermore, the surface 8a and the surface 14a face one another, so that also the first and second reflectors 10, 16 face one another.

The cap 2b is provided with a first window 20, arranged above, and at a distance from, the first reflector 10. In particular, the first window 20 is superposed (or at least partially aligned along Z axis) to the first reflector 10. However, as is apparent from the previous description, the first window 20 lies on a plane parallel to the XY plane, while the first reflector 10 lies on a plane inclined 45 degrees with respect to the XY plane.

The emitter 12 is furthermore arranged in such a way that a beam 18 emitted, during use, by the emitter 12 is directed towards the second reflector 16. The second reflector 16 is arranged in such a way that the beam 18 is reflected towards the first reflector 10. The first reflector 10 is arranged in such a way that the beam 18 thus received is reflected towards the first window 20. This condition is verified, for example, when the following conditions are verified: (i) the first and second reflectors 10, 16 are arranged on the respective supporting elements 8, 14 inclined by 45 degrees with respect to the XY plane (as discussed above); and (ii) the beam 18 emitted by the emitter 12 is directed along the Z axis (which is orthogonal to the XY plane). Other respective arrangements of the emitter 12 (beam 18), first reflector 10 and second reflector 16 may be used, provided that the beam 18 is reflected by the first reflector 10 towards the first window 20.

The first window 20 includes an aperture through the cap 2b to which is optionally coupled a lens (for example used to magnify the beam reflected by the first reflector 10). Such lens is, for example, based on Wafer-Level Optics (WLO) technology, which enables the design and manufacture of miniaturized optics at the wafer level using semiconductor-like techniques.

Alternatively, when a lens is not provided, another protection element may be present at the first window 20, to prevent particulate, dust, etc. to enter within the chamber 4 and compromise the functioning of the electronic module 1. In general, such lens/protection element is of a material that allows the beam 18 to pass through it and exit from the chamber 4, so that a beam is generated as output from the electronic module 1.

The chamber 4 further houses a detector 22, configured to detect a received beam 24 from an environment external to the chamber 4. The detector 22 is, for example, mechanically coupled to the first surface 2a' of the base substrate 2a, in a per se known way.

According to an embodiment, the detector 22 is an IR detector configured to detect a received IR radiation. In particular, a Single-Photon Avalanche Diode (SPAD) can be used as detector 22.

The cap 2a further comprises a second window 26, that includes an aperture through the cap 2b, to which is optionally coupled a respective lens (for example to focus the received beam 24 and/or to correct aberration).

When a lens is not present at the second window 26, another respective protection element may be present to prevent particulate, dust, etc. to enter within the chamber 4 and compromise the functioning of the electronic module 1. In general, the lens/protection element coupled to the second window 26 is of a material that allows the received beam 24 to pass through it and enter the chamber 4, so that the received beam 24 is an input to the electronic module 1.

The second window 26 is above, and at least partially aligned along Z axis to, the detector 22 (the second window 26 is in particular superposed to the detector 22, at a distance from the detector 22, or in contact with it). In particular, the second window 26 and the detector 22 are reciprocally arranged such that the received beam 24 passing through the second window 26 is directed towards a sensing portion of the detector 22, to be detected.

The proposed architecture allows the integration in a same package of VCSEL laser diode as light source (generally, an emitter) and a SPAD (generally, a detector), with significant impact on the reduction of costs and dimensions. By integrating all the components in a package-level module, the volumes of the module are reduced and optimized. By reducing the dimensions, the proposed solution enables better integration of 3D sensing applications into portable devices and mobile phones.

Figure 2:
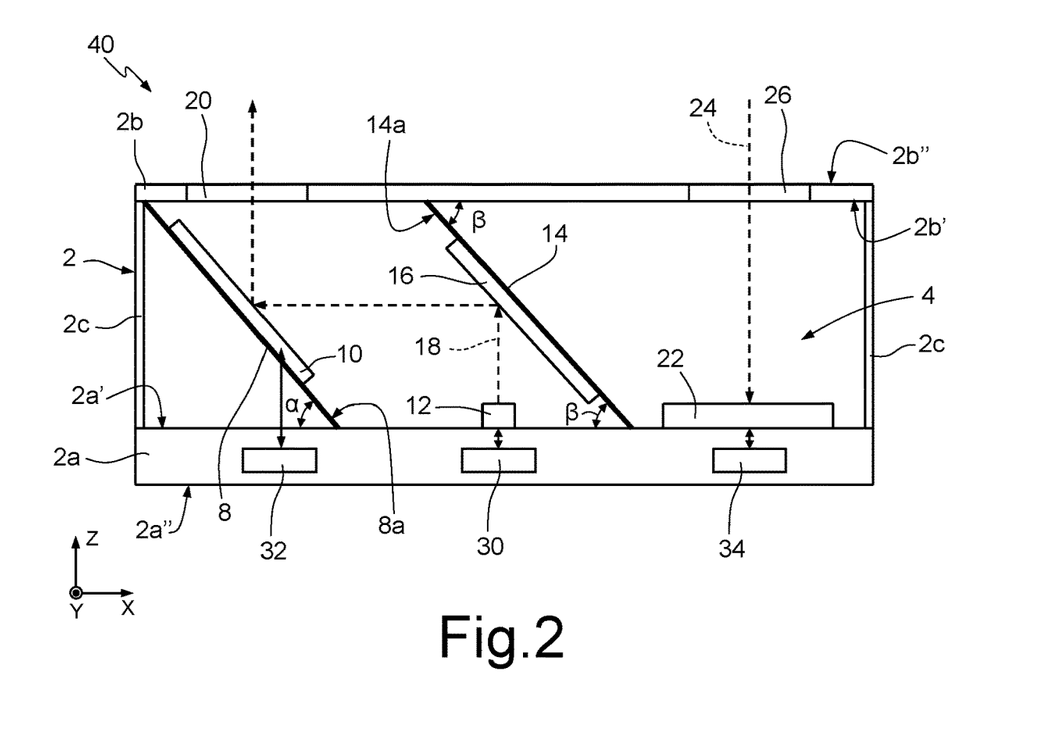

FIG. 2 shows an electronic module 40 according to a further embodiment. Features of the electronic module 40 common to the electronic module 1 are identified with the same reference numerals, and not further described. In the electronic module 40 of FIG. 2, one or more among electronic circuitry 30 for controlling the emitter 12 (for controlling the generation of the beam 18), electronic circuitry 32 for driving the micro-mirror 10 and electronic circuitry 34 for processing the signal transduced by the detector 22 are integrated within the base substrate 2a. Further circuitry, configured to carry out further computation required by a specific application, may also be integrated within the base substrate 2a. Accordingly, the integration level is still further enhanced. The use of a MEMS scanner for implementing the first reflector 10 allows to reduce and to compact the dimensions and to achieve at the same time a high resolution.

It is noted that the supporting elements 8 and 14 may either be mechanically coupled, or fixed, to the base substrate 2a, the cap 2b or to both the base substrate 2a and the cap 2b.

Figure 3:
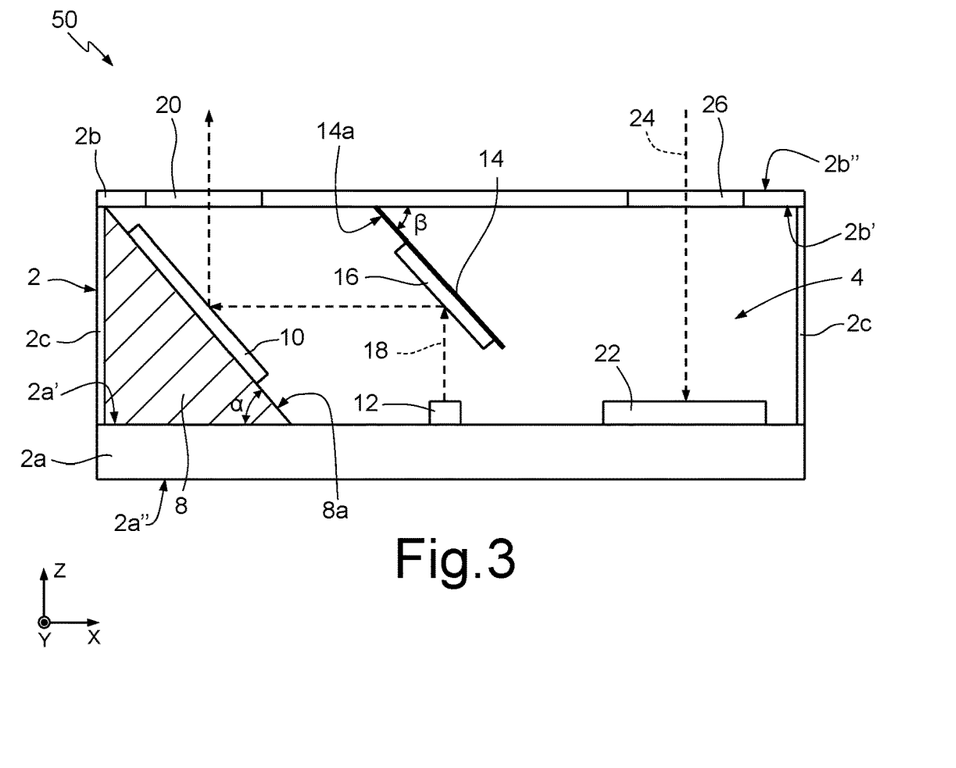

FIG. 3 shows an electronic module 50 according to a further embodiment. Features of the electronic module 50 common to the electronic module 1 and/or 40 are identified with the same reference numerals, and not further described.

The electronic module 50 includes a first supporting element 8 having a wedge-like shape, that rests on, and is fixed to, the base substrate 2a only (at the first surface 2a'). The first supporting element 8 may or may not reach the first surface 2b' of the cap 2b. The second supporting element 14 is an inclined wall fixed to the cap 2b only (at the first surface 2b') and may or may not reach the first surface 2a' of the base substrate 2a.

In particular, in FIG. 3, the second supporting element 14 does not reach (is not in contact with) the base substrate 2a.

The first supporting element 8 may be formed integral with the base substrate 2a, or as a separate body coupled to the base substrate 2a by means of glue, soldering paste, or other mechanical means, for example, screws. Analogously, the second supporting element 14 may be formed integral with the cap 2b, or as a separate body coupled to the cap 2b by means of glue, soldering paste, or other mechanical means, for example screws.

The electronic circuitry 30-34 described with reference to FIG. 2 can be part of the embodiment of FIG. 3, or it may be absent (it is not shown in FIG. 3).

Figure 4:
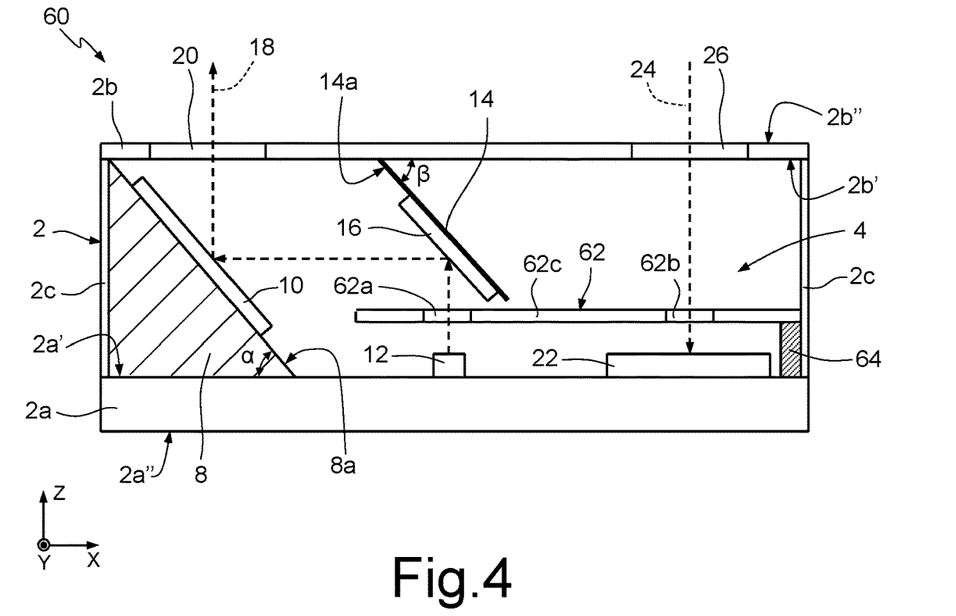

FIG. 4 shows a further embodiment, illustrating an electronic module 60. Features of the electronic module 60 common to the electronic module 1 or 40 or 50 are identified with the same reference numerals, and not further described.

The electronic module 60 further comprises, with respect to the embodiment of FIG. 3, a lens module 62 arranged within the chamber 4 and provided with a first lens 62a operatively coupled to the emitter 12 and a second lens 62b operatively coupled to the detector 22. To this end, a frame structure 62c surrounds and sustain the lenses 62a, 62b. The frame structure 62c can be coupled to the base substrate 2a within the chamber 4 through a supporting element 64 arranged next to the lateral walls 2c. The supporting element 64 may also be formed in a different way, for example as disclosed with reference to FIGS. 6A, 6B and FIGS. 9A, 9B.

The first lens 62a is made of, for example, glass or plastic, and is configured to focus onto the second reflector 16 the beam 18 generated by the emitter 12. The second lens 62b is made of, for example, glass or plastic, and is configured to focus the incoming beam 24 onto the detector 22. The lenses 62a and 62b are, for example, based on Wafer-Level Optics (WLO) technology.

The first supporting element 8 corresponds to that already described with reference to FIG. 3, but it may also be replaced by that of FIG. 1 or FIG. 2. The second supporting element 14 corresponds to that described with reference to FIG. 3, such that the lens module 62 extends between the base substrate 2a (above the emitter 12 and the detector 22) and the supporting element 14.

The electronic circuitry 30-34 described with reference to FIG. 2 can be part of the embodiment of FIG. 4, or it may be absent (not shown in FIG. 4). Also, the wedge-shaped supporting element 8 of FIG. 3 can be part of the embodiment of FIG. 4, or supporting element 8 may be manufactured in a different way, for example as shown in FIG. 1.

Figure 11:
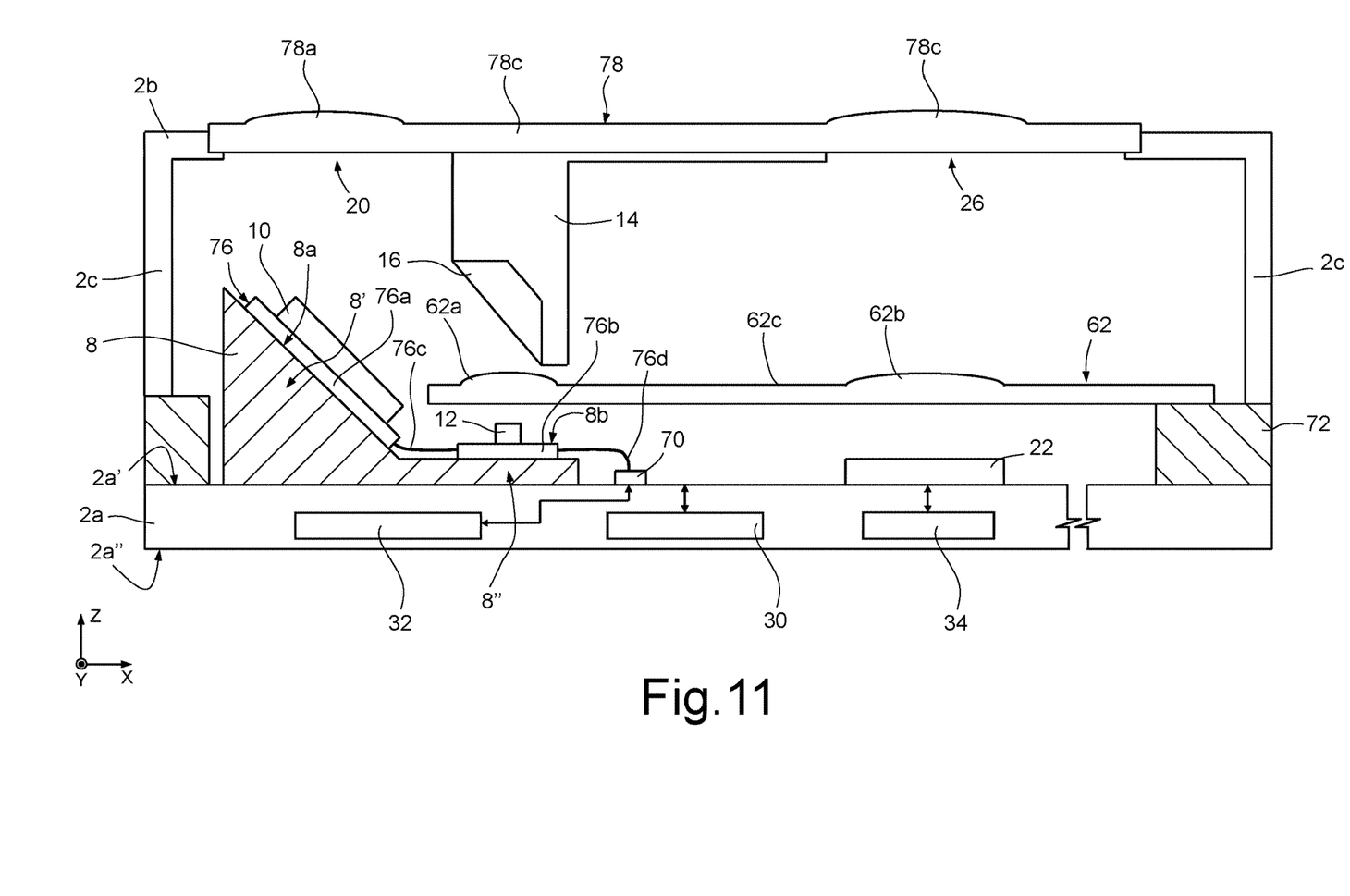
FIG. 11 shows the electronic module manufactured according to the steps of FIGS. 5A-10.

FIGS. 5A-11 illustrates a method for manufacturing (specifically, assembling) an electronic module 80 (shown in FIG. 11 at the end of manufacturing steps).

Figure 5A:
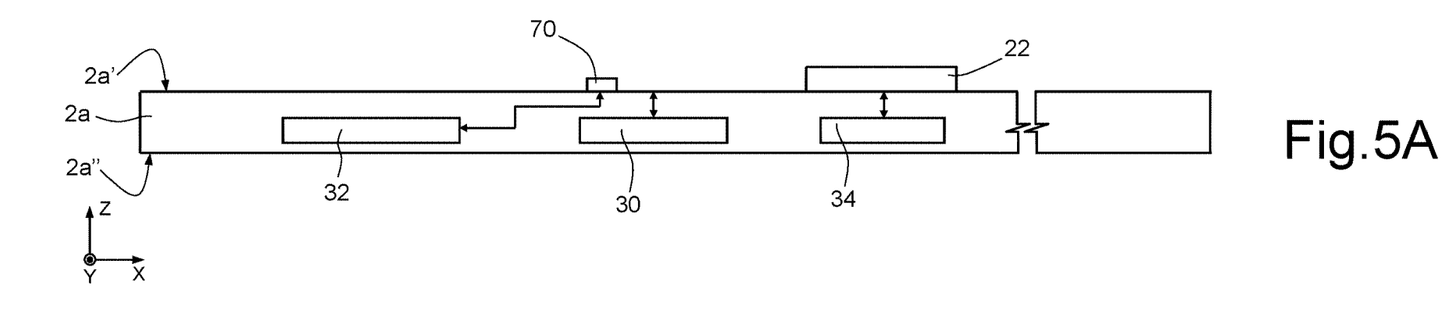

With reference to FIG. 5A, which is a lateral cross-sectional view (on plane XZ), the base substrate 2a is provided. Here, the base substrate 2a is in particular an organic substrate with ICs laminated inside. A laminated material such as FR-4 or BT (bismaleimide triazine) can be used. Alternatively, the base substrate 2a is of plastic material or of semiconductor material.

The base substrate 2a integrates the electronic circuitry 30 for controlling the emitter 12, the electronic circuitry 32 for driving the micro-mirror 10 and the electronic circuitry 34 for processing the signal transduced by the detector 22. On the first surface 2a' of the base substrate 2a one or more pads 70 are provided for supplying the driving signals for the first reflector 10 in case the latter is implemented by means of a micro-mirror or MEMS scanner. The one or more pads 70 are electrically coupled to the electronic circuitry 32 through metallic routing path(s) provided within the substrate 2a.

On the first surface 2a' of the base substrate 2a the detector 22 is coupled, for example by means of glue, die attach film, solder joints, etc. The detector 22 is electrically coupled to the electronic circuitry 34 through metallic routing path(s) provided within the substrate 2a, for receiving the signals transduced by the detector 22.

The reciprocal arrangement of the elements shown in FIG. 5A is for illustrative purpose only, and is not limitative of the present invention.

Figure 5B:
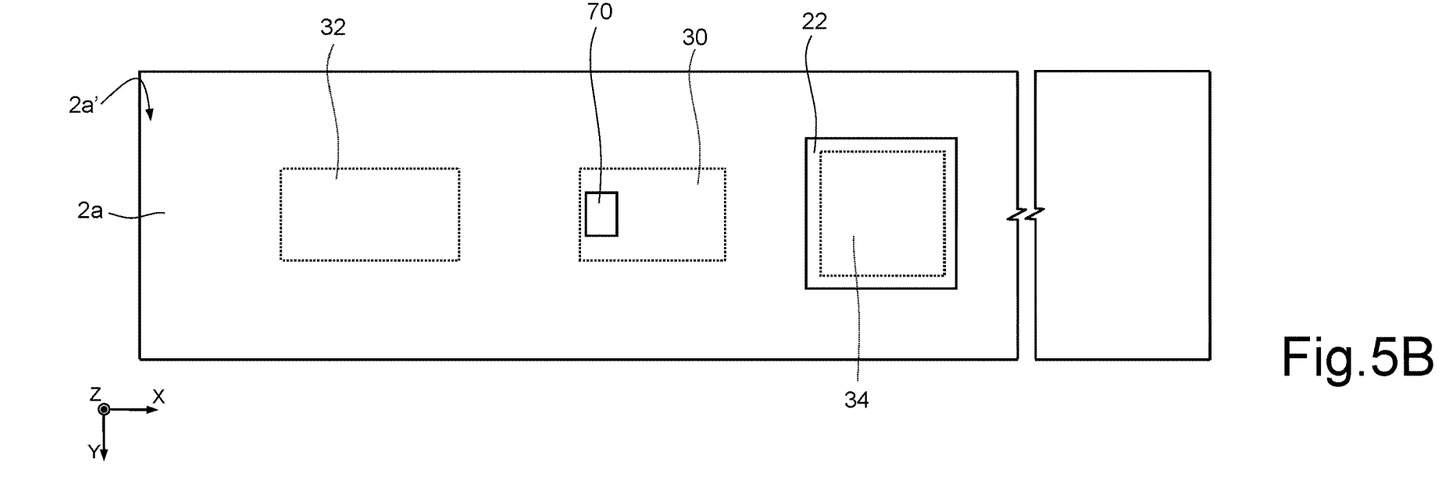

FIG. 5B is a top-plan view (on XY plane) of FIG. 5A.

Figure 6A:
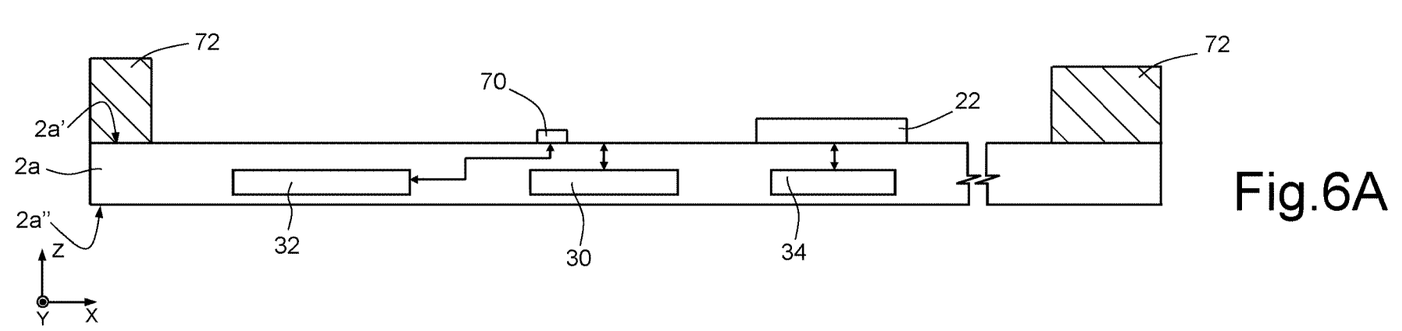

Then, as shown in FIG. 6A, a spacer structure 72, configured to form an interface for mounting the lateral walls 2c and the cap 2b on the base substrate 2a, is coupled to the base substrate 2a, in particular at peripheral portions of the base substrate 2a. As it can be appreciated in the following, the spacer structure 72 is configured to sustain the lateral walls 2c and the cap 2b, and at the same time has the function of the supporting element 64 described with reference to FIG. 4.

Figure 6B:
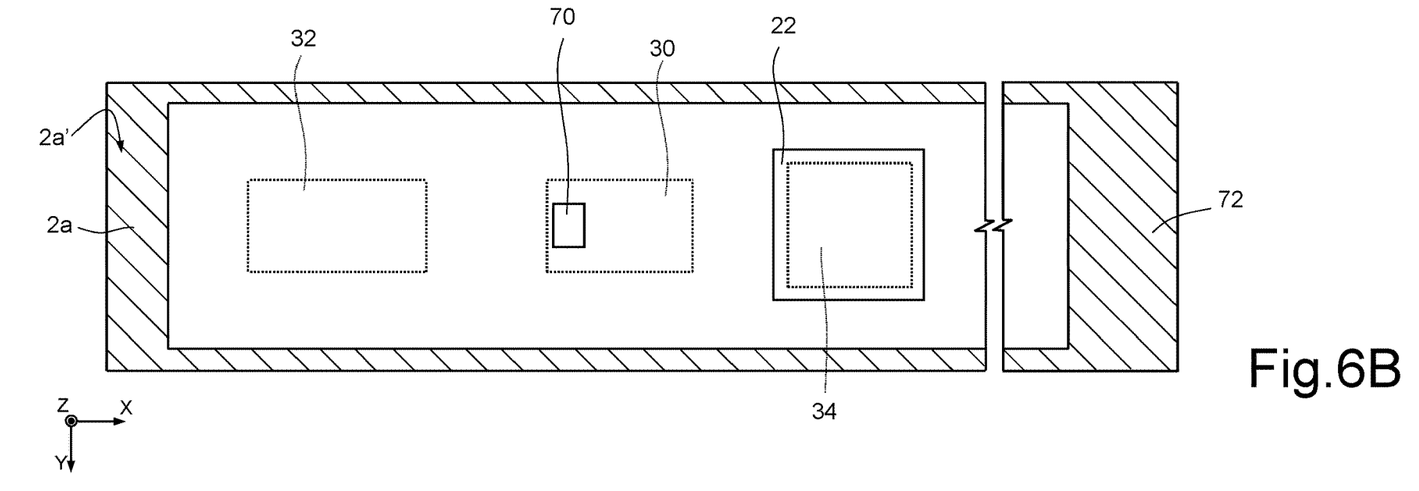

As it can be appreciated from the top-plan view of FIG. 6B, the spacer structure 72 completely surrounds a superficial region of the base substrate 2a where the detector 22 is located and where, during successive steps of manufacturing, the first supporting element 8 and the emitter 12 will be arranged.

Figure 7A:
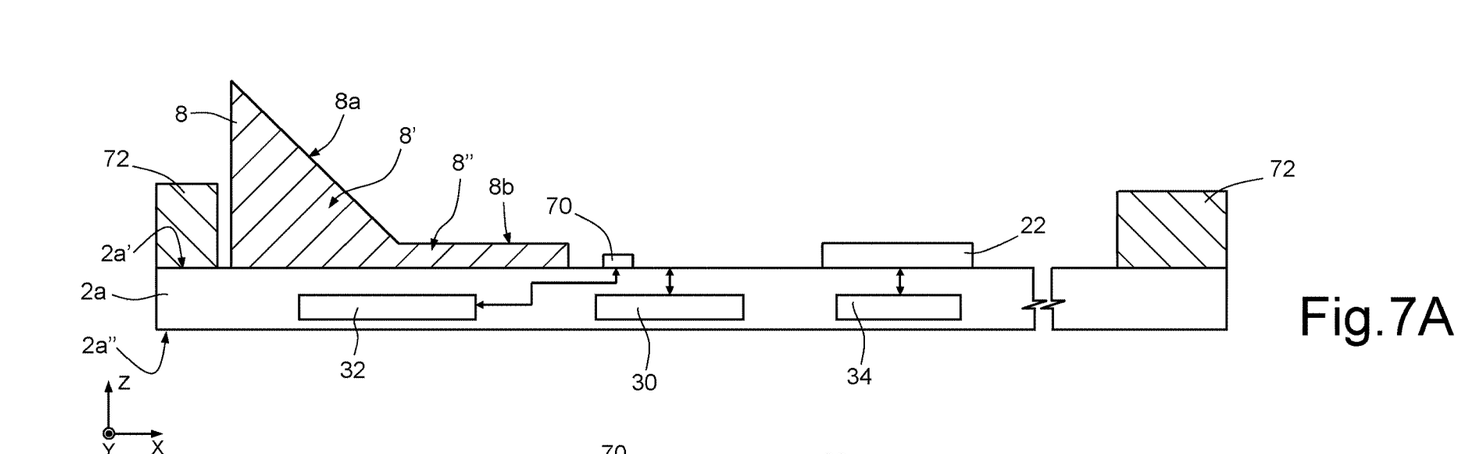

With reference to FIG. 7A the first supporting element 8 is coupled to the base substrate 2a through a layer of glue.

Figure 7B:
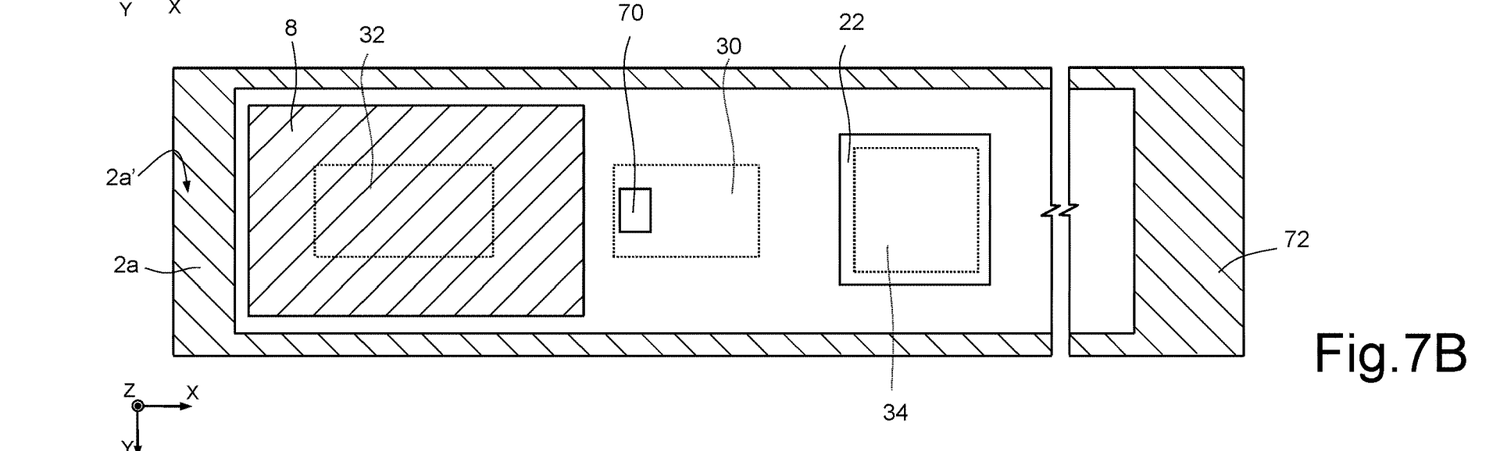

FIG. 7B is a top-plan view (on XY plane) of FIG. 7A.

The first supporting element 8 is, in particular, a solid body of metal material having the further function of heat-sink for the first reflector 10, as already discussed previously. Furthermore, in the embodiment of FIG. 7A, the supporting element 8 is provided with a first portion 8' including the inclined surface 8a, and with a second portion 8" extending in continuity with the first portion 8' and having a respective surface 8b parallel to the XY plane. The second portion 8" is configured to, and has the function of, supporting the emitter 12 and operates as a heat-sink for the emitter 12.

In FIGS. 7A, 7B, the first and second portions 8', 8" are integral with one another; however, according to a different embodiment, the first and second portions 8', 8" may be two separate elements.

Figure 8A:
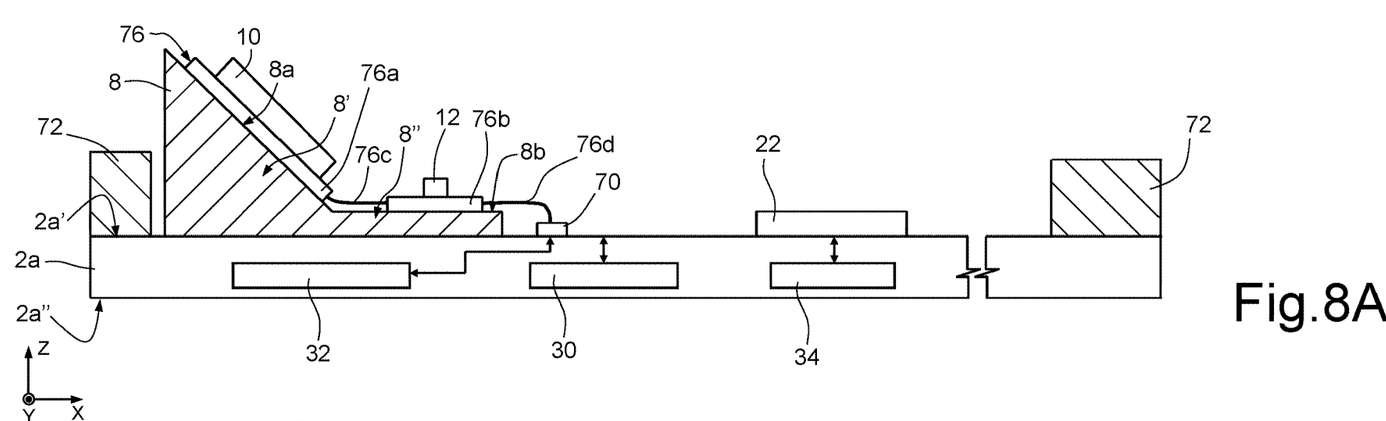

With reference to FIG. 8A, a PCB 76, in particular a rigid-flex circuit, is coupled to the supporting element 8, for example by means of thermally conductive glue. The rigid-flex circuit 76 includes a first rigid portion 76a coupled to the first portion 8' of the supporting element 8 and a second rigid portion 76b coupled to the second portion 8" of the supporting element 8. A flexible portion 76c connects the first rigid portion 76a to the second rigid portion 76b. The flexible portion 76c extends at the intersection between the first portion 8' and the second portion 8", so that it can follow the change in slope between the first portion 8' and the second portion 8". The first rigid portion 76a carries the first reflector 10 and the second rigid portion 76b carries the emitter 12. Alternatively to the embodiment shown in the drawings, the electronics 34 that controls/drives the emitter 12 is not integrated within the base substrate 2a, but it can be integrated into, or mechanically coupled to, the second rigid portion 76b.

A further flexible portion 76d is connected at one end to the second rigid portion 76b and at another end to the pad(s) 70, for supplying the driving signals and the power supply to the first reflector 10 and to the emitter 12. Other means alternative to, or in addition to, the flexible portion 76c can be provided, for example wire bonding.

Figure 8B:
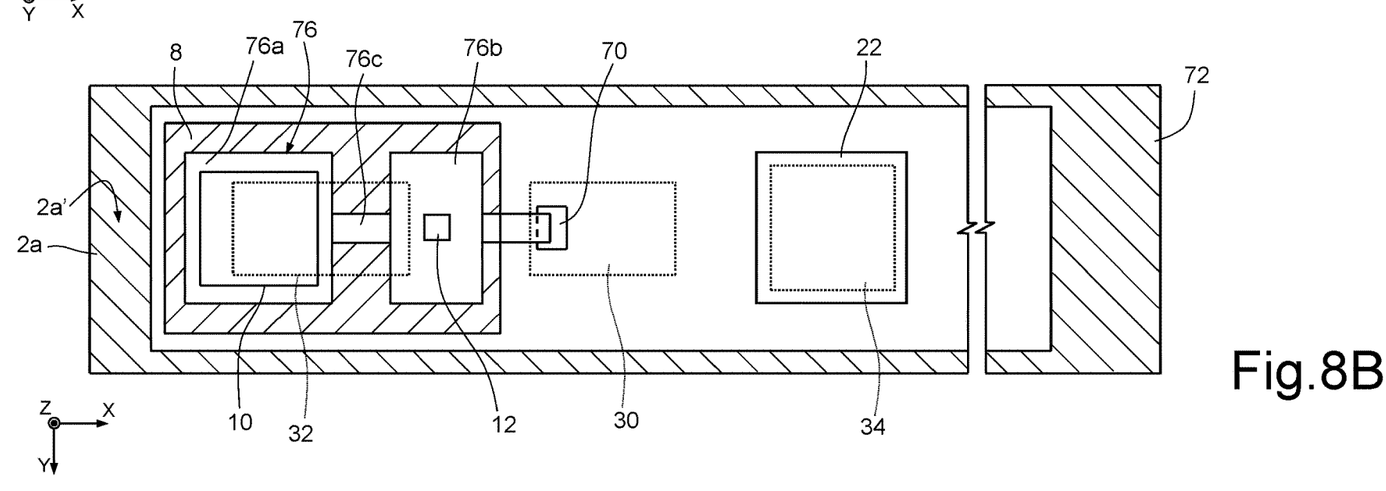

FIG. 8B is a top-plan view (on XY plane) of FIG. 8A.

Figure 9A:
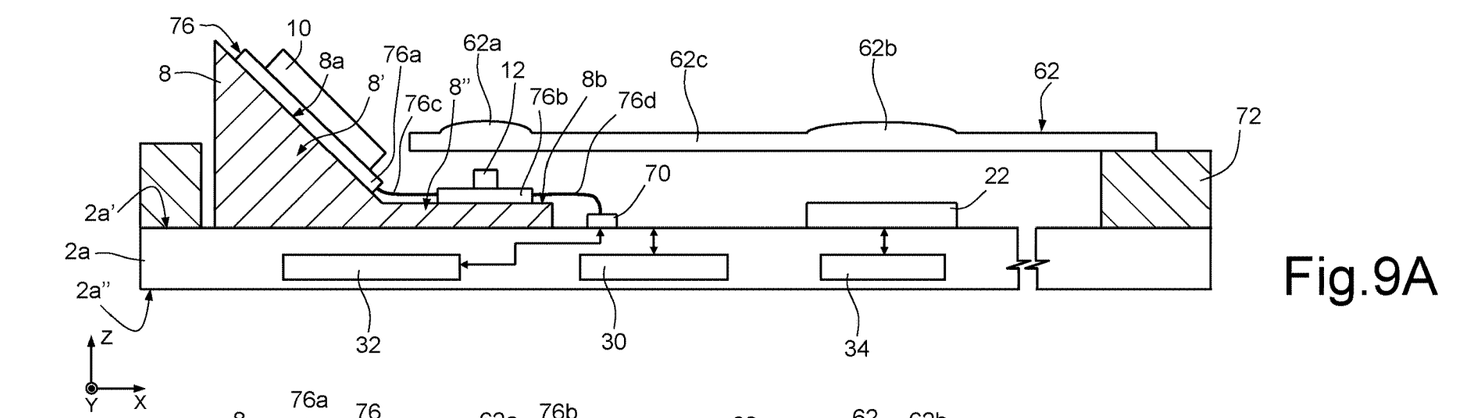

With reference to FIG. 9A, the lens module 62 disclosed with reference to FIG. 4 is provided and arranged in such a way that the first lens 62a is operatively coupled to the emitter 12 and the second lens 62b is operatively coupled to the detector 22. The frame structure 62c is coupled to, and sustained by, the spacer structure 72.

Figure 9B:
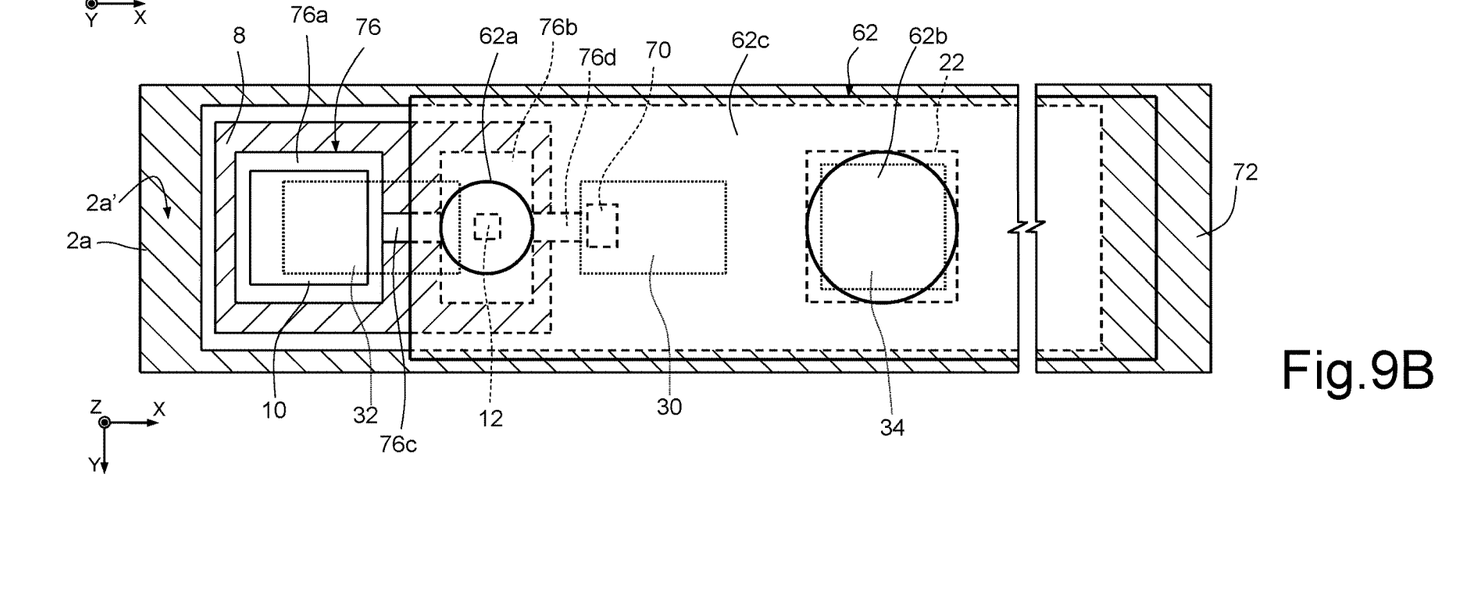

FIG. 9B is a top-plan view (on XY plane) of FIG. 9A.

Figure 10:
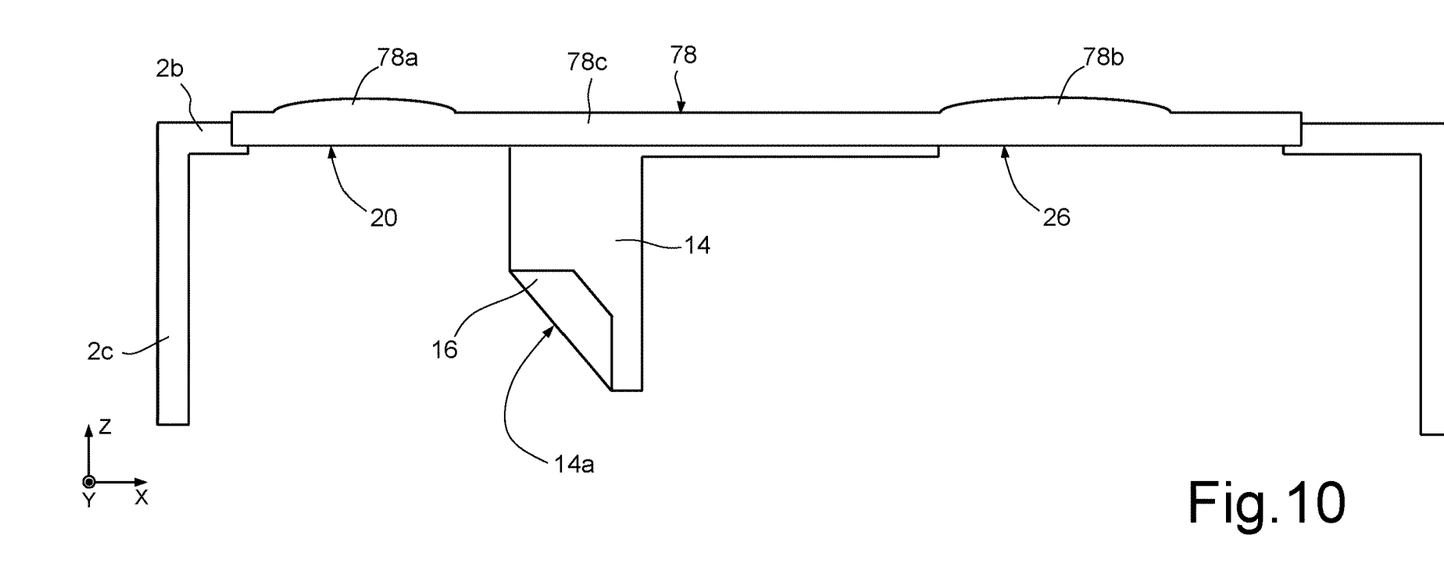

FIG. 10 shows, in a lateral cross-sectional view taken on XZ plane, of the cap 2b, which is formed integral with the lateral walls 2c. Integral with the cap 2b is also present the second supporting element 14, with the second reflector 16 coupled to it. The extension, measured along the Z-axis, of the second supporting element 14, is less than the extension, measured along the Z-axis, of the lateral walls 2c, so that when the cap 2b is mounted on the base substrate 2a the second supporting element 14 is at a distance from the lens module 62.

The cap 2b is here provided with the first and second window 20, 26, to which, in turn, a further lens module 78 is coupled. In particular, the lens module 78 includes a first lens 78a and a second lens 78b. The first lens 78a is operatively coupled (and aligned) to the first reflector 10 to receive the beam reflected by the first reflector 10, while the second lens 78b is operatively coupled (and aligned along the Z axis) to the detector 22. The first lens 78a is made of glass or plastic and is configured to magnify the output radiation 18 (for example it is a divergent lens). The second lens 78b is made of glass or plastic, and is configured to focus the incoming beam 24 on the detector 22 and/or correct aberrations of the incoming beam 24. The lenses 78a and 78b are, for example, based on Wafer-Level Optics (WLO) technology.

A frame structure 78c surrounds and holds the lenses 78a, 78b. The frame structure 78c is, for example, coupled on top of the cap 2b.

The lateral walls 2c can be coupled to the spacer structure 72 through a coupling region made of at least one among glue, solder paste.

The cap 2b and the lateral walls 2c are made of at least one among: plastic material, metallic material, semiconductor material.

FIG. 11 shows, in a lateral cross-sectional view taken on XZ plane, the cap 2b of FIG. 10 coupled to the structure of FIG. 9A, to form the electronic module 80 according to the respective embodiment.

The electronic module 1, 40, 50, 60 disclosed, with reference to the respective embodiments of FIGS. 1-4 and FIG. 11, can be used as a time-of-flight device/camera to perform 3D sensing, for example for smartphones applications, such as face recognition. In this context, direct or sinusoidal short light flashes (beam 18) are emitted by the emitter 12; the beam outputted from the first window 20 impinges onto an object, is reflected back, and enters the chamber 4 through the second window 26. The received beam 24 is then captured by the detector 22. The travel time of the light from the emitter 12 to the object and back to the detector 22 is calculated by a computing circuit (for example, a processor, or processing unit). The computing circuit may be either integrated within the base substrate 2a or provided external to the electronic module 80. The measured coordinates then generate a 3D picture of the object. The processing details and calculation of the time of flight belongs to the known art and is not, per se, part of the present invention. Therefore, it will not be described in details.

The electronic module 80 can also be used in the context of structured light applications for 3D sensing. In this case, the detector 22 is preferentially a CMOS sensor formed by a matrix of pixels, configured to detect an image from the incoming beam 24. Processing algorithms, known in the art, can be used to acquire information from the detected image to perform 3D sensing, such as face recognition.

Figure 12:
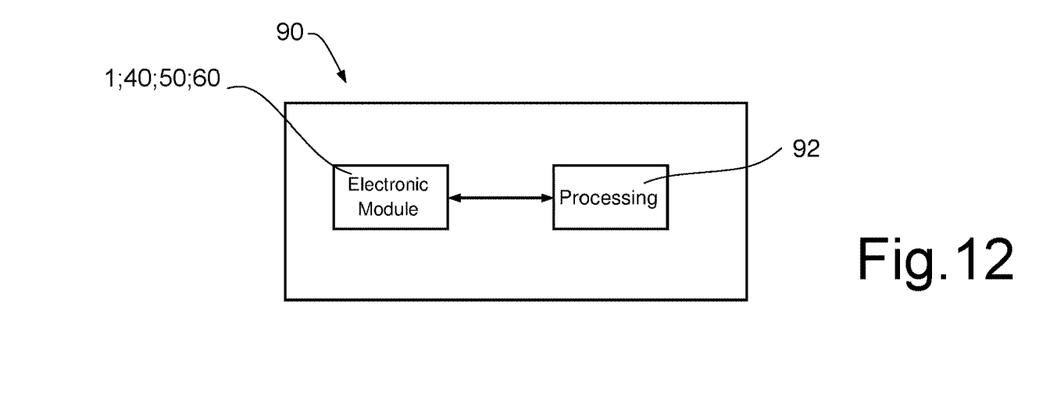
FIG. 12 schematically shows a system including the electronic module using any of the embodiments of FIGS. 1-4 and 11.

FIG. 12 schematically shows a system 90, in particular a 3D scanning device or 3D scanner, including at least one electronic module 1, 40, 50, 60, according to the respective embodiment, operatively coupled to a processing unit 92 that is configured to perform 3D sensing based on a structured light approach, a time-of-flight approach, or the like. As an example, in case of time-of-flight approach, the processing unit 92 is configured to calculate a travel time between a first time instant, corresponding to generation of the first radiation 18 by the emitter 12, and a second time instant, corresponding to the detection of the second radiation 24 by the detector 22, so as to determine the travel time of the beam from the emitter 12 to the object and back to the detector 22. Irrespective of the approach used, a 3D image of the object can be reconstructed by the processing unit 92, in a per se known way.

The processing unit 92 can be integrated in the base substrate 2a or be external to the electronic module1, 40, 50, 60. The system 90 implements 3D sensing application(s), in particular for face recognition. The system 90 is, generally, an electronic device, more in particular a portable electronic device, such as a smartphone, a tablet, a notebook; or, alternatively, a desktop computer.

From an examination of the characteristics of the invention provided according to the present disclosure, the advantages that it affords are evident.

The proposed architecture allows the integration of a light source (emitter, in particular a VCSEL laser diode), with significant impact on lowering of cost and dimensions.

By integrating all the components in a package level module, the volumes of the solution is reduced and optimized. By reducing the dimensions, the proposed solution enables the integration into portable devices and mobile phones.

Finally, it is clear that modifications and variations may be made to what has been described and illustrated herein, without thereby departing from the sphere of protection of the present invention, as defined in the annexed claims.

The invention claimed is:

1. An electronic module, comprising:
a base substrate having an upper surface;
a covering structure that is coupled to the base substrate and forms, with said base substrate, a chamber;
an emitter mounted to the upper surface of the base substrate and positioned within said chamber, said emitter configured to generate a first radiation;
a first reflector in said chamber, wherein said first reflector is carried by and in direct physical contact with a supporting structure within said chamber, said supporting structure mounted to the upper surface of the base substrate, said supporting structure being formed of a thermal-conducting material to provide a heat-sink for the first reflector;
a second reflector in said chamber;
a first window which extends through the covering structure and is transparent to said first radiation;
a second window which extends through the covering structure at a distance from said first window and is transparent to a second radiation coming from an environment out of said chamber; and
a detector mounted to the upper surface of the base substrate and positioned within said chamber, said detector configured to sense said second radiation,
wherein the emitter, the first reflector and the second reflector are reciprocally arranged such that the first radiation generated by the emitter is reflected by the second reflector towards the first reflector and reflected by the first reflector towards the first window to form an output of said electronic module, and
wherein the detector and the second window are reciprocally arranged such that the second radiation passing through the second window is received by the detector.

2. The electronic module according to claim 1, wherein the upper surface extends parallel to a reference plane, and further comprising:
a first supporting structure that extends in the chamber with a supporting surface inclined with respect to said reference plane; and
a second supporting structure that extends in the chamber with a supporting surface inclined with respect to said reference plane,
wherein the first reflector is coupled to the supporting surface of the first supporting structure,
wherein the second reflector is coupled to the supporting surface of the second supporting structure, and
wherein the supporting surfaces of the first and second supporting structures face one another so that the first radiation is reflected by the second reflector towards the first reflector.

3. The electronic module according to claim 2, wherein the supporting surfaces of the first and second supporting structures respectively form an angle of 45 degrees with said reference plane, and wherein said first radiation generated by the emitter is directed along an axis orthogonal to said reference plane.

4. The electronic module according to claim 2, wherein the base substrate comprises a printed circuit board, said first reflector and said emitter being electrically coupled to the printed circuit board.

5. The electronic module according to claim 4, wherein the printed circuit board is of a rigid-flex type including: a first rigid portion coupled to the supporting surface of the first supporting structure and having said inclination with respect to said reference plane; a second rigid portion at the upper surface of the base substrate and extending parallel to the reference plane; and a flexible portion electrically connecting together the first and the second rigid portions.

6. The electronic module according to claim 2, wherein the second supporting structure is mechanically coupled to the covering structure and extends towards the base substrate at a distance from the base substrate.

7. The electronic module according to claim 1, wherein the base substrate integrates one or more among: a first electronic circuit configured to control the emitter to generate the first radiation; and a second electronic circuit configured to process a signal transduced by the detector in response to the received second radiation.

8. The electronic module according to claim 1, wherein the first reflector is a microelectro-mechanical systems (MEMS) reflector of a resonant type, configured to oscillate around a resting position.

9. The electronic module according to claim 8, wherein the base substrate integrates a driving circuit configured to drive the first reflector in order to generate said oscillation.

10. The electronic module according to claim 1, further comprising a lens arranged between the detector and the second window to focus the second radiation.

11. The electronic module according to claim 1, further comprising an outer lens module coupled to the covering structure, including a first lens operatively coupled to the first window to magnify the first radiation reflected by the first reflector.

12. The electronic module according to claim 11, further comprising a second lens operatively coupled to the second window to focus the second radiation.

13. The electronic module according to claim 1, wherein the emitter is a Vertical-Cavity Surface-Emitting LASER (VCSEL) and wherein the detector is a Single-Photon Avalanche Diode (SPAD).

14. A three dimensional (3D) scanning device, comprising:
an electronic module according to claim 1; and
a processing unit coupled to the electronic module and configured to process a signal transduced by the detector from the sensed second radiation in order to carry out a 3D sensing of an object or a subject through one of a structured light approach or a time-of-flight approach.

15. The 3D scanning device according to claim 14, wherein the 3D scanning device is a component of a produce selected from the group consisting of a smartphone, a tablet, a notebook, a desktop computer, a portable electronic device.

16. The 3D scanning device according to claim 14, wherein processing device performs face recognition.

17. An electronic module, comprising:
a base substrate having an upper surface;
a covering structure that is coupled to the base substrate and forms, with said base substrate, a chamber;
an emitter mounted to the upper surface of the base substrate and positioned within said chamber, said emitter configured to generate a first radiation;
a first reflector in said chamber;
a second reflector in said chamber;
a first window which extends through the covering structure and is transparent to said first radiation;
a second window which extends through the covering structure at a distance from said first window and is transparent to a second radiation coming from an environment out of said chamber;
a detector mounted to the upper surface of the base substrate and positioned within said chamber, said detector configured to sense said second radiation,
an inner lens module in the chamber, including a frame structure carrying a first lens so as to be arranged between the emitter and the second reflector to focus the first radiation, the frame structure mounted to a supporting element, the supporting element mounted to the upper surface of the base substrate;
wherein the emitter, the first reflector and the second reflector are reciprocally arranged such that the first radiation generated by the emitter is reflected by the second reflector towards the first reflector and reflected by the first reflector towards the first window to form an output of said electronic module, and
wherein the detector and the second window are reciprocally arranged such that the second radiation passing through the second window is received by the detector.

18. The electronic module according to claim 17, wherein the upper surface extends parallel to a reference plane, and further comprising:
a first supporting structure that extends in the chamber with a supporting surface inclined with respect to said reference plane; and
a second supporting structure that extends in the chamber with a supporting surface inclined with respect to said reference plane,
wherein the first reflector is coupled to the supporting surface of the first supporting structure,
wherein the second reflector is coupled to the supporting surface of the second supporting structure, and
wherein the supporting surfaces of the first and second supporting structures face one another so that the first radiation is reflected by the second reflector towards the first reflector.

19. The electronic module according to claim 18, wherein the supporting surfaces of the first and second supporting structures respectively form an angle of 45 degrees with said reference plane, and wherein said first radiation generated by the emitter is directed along an axis orthogonal to said reference plane.

20. The electronic module according to claim 18, wherein the base substrate comprises a printed circuit board, said first reflector and said emitter being electrically coupled to the printed circuit board.

21. The electronic module according to claim 20, wherein the printed circuit board is of a rigid-flex type including: a first rigid portion coupled to the supporting surface of the first supporting structure and having said inclination with respect to said reference plane; a second rigid portion at the upper surface of the base substrate and extending parallel to the reference plane; and a flexible portion electrically connecting together the first and the second rigid portions.

22. The electronic module according to claim 18, wherein the second supporting structure is mechanically coupled to the covering structure and extends towards the base substrate at a distance from the base substrate.

23. The electronic module according to claim 17, wherein the base substrate integrates one or more among: a first electronic circuit configured to control the emitter to generate the first radiation; and a second electronic circuit configured to process a signal transduced by the detector in response to the received second radiation.

24. The electronic module according to claim 17, wherein the first reflector is a microelectro-mechanical (MEMS) reflector of a resonant type, configured to oscillate around a resting position.

25. The electronic module according to claim 24, wherein the base substrate integrates a driving circuit configured to drive the first reflector in order to generate said oscillation.

26. The electronic module according to claim 24, wherein the first reflector is thermally coupled to a supporting structure, and wherein the supporting structure is made of thermal-conducting material to provide a heat-sink for the first reflector.

27. The electronic module according to claim 17, further comprising a second lens operatively coupled to the second window to focus the second radiation.

* * * * *